June 9, 1931.  E. G. GUNN  1,809,411
BRAKE
Filed June 24, 1929

Witness:
Chas. R. Konish

Inventor:
Earl G. Gunn
By Offield Towle Hope Heath & Poole
Attys.

Patented June 9, 1931

1,809,411

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed June 24, 1929. Serial No. 373,104.

This invention relates to improvements in brakes designed for automotive vehicles, and more particularly to applying and adjusting means for such brakes.

The principal object of the invention is to provide an improved construction including an operating lever normally extending from the brake in a direction generally parallel to the wheel axis, together with means for adjusting the position of the braking devices within the drum, and which adjusting means also automatically maintain the operating lever to its proper angular position relative to the wheel.

Certain constructions have heretofore been employed in which the brake actuating lever extends inwardly from the brake drum, this arrangement sometimes being particularly convenient for connection to the brake rods, as for instance on the rear wheels, where the axle or chassis construction makes it difficult to provide operating connections with the more usual arrangement of brake operating lever disposed close to the wheel. With such inwardly extending levers, however, each readjustment of the brakes, such as usually necessary on account of wear of the brake lining, usually causes the actuating lever to be displaced toward the direction in which the brake is applied, with a result that the effective angle of movement of said lever is considerably decreased; as is also the power which is finally transmitted to the brakes.

In carrying out my invention, I provide an improved construction including an inwardly extending lever, and a mounting for said lever which is movable with the brake adjusting device, so that the operation of adjusting the brakes simultaneously and automatically returns the main operating lever to its proper initial angular position relative to the drum.

The invention may best be understood by reference to the accompanying drawings, in which Figure 1 is a face view of a brake constructed in accordance with my invention showing the brake drum in section.

Figure 1:
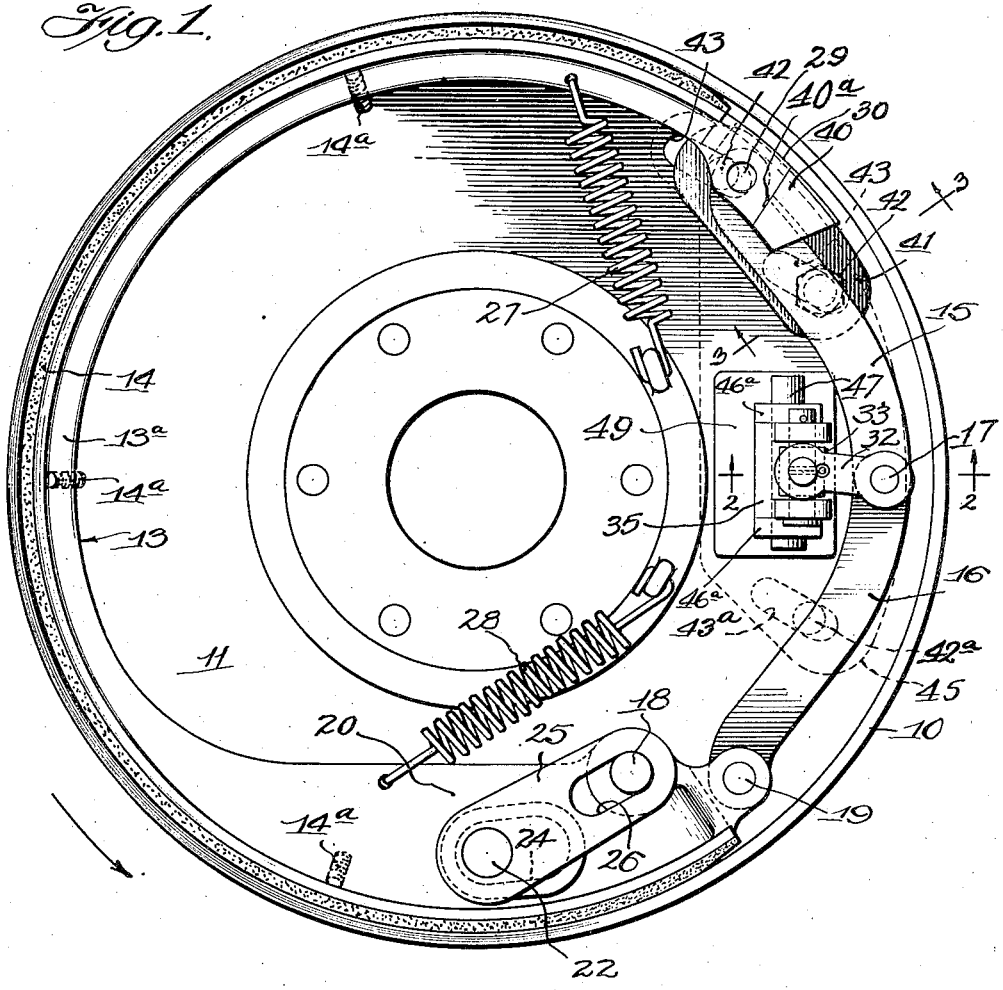

Referring to details of the embodiment of my invention illustrated in the drawings, the brake shown therein comprises a brake drum 10 which is mounted on the wheel (not shown) in the usual manner, and with a backing plate 11 in non-rotative relation to the axle and upon which is mounted the brake band 12 and its operating mechanism.

As a means of illustrating my improved form of applying and adjusting device, I have shown herein a brake of the internal expanding band type which is broadly disclosed in my copending application filed June 14, 1929 and bearing Serial No. 370,802. This brake comprises a band member 13 which extends through an arc of substantially more than 180° and is provided with a friction lining 14. The band member 13 has an integral web 13a which is increased in height near one end thereof to form an end piece 20.

The end piece 20 is connected with anchoring means effective when the vehicle is moving forwardly, with the wheel and drum rotating in a counter-clockwise direction, as indicated by the arrow. This brake anchor comprises a pin 22 suitably secured to the backing plate 11 and extending through an elongated slot 24 formed in the end piece 20. A link 25 is pivotally mounted on said anchor pin 22 and connects to a pin 18 near the extreme end of the end piece 20. The pin 18 works in a slot 26 formed in link 25, as shown.

The link 25 is preferably disposed to extend in a line substantially perpendicular to a radial line including the axis of pivot pin 18. The link 25 is thus placed under tension when the brake is applied, so as to stabilize the position of the end piece 20 and limit the tendency of the band to wedge or wrap in adjacent the anchored end of said band.

The opposite end of the brake band is provided with another and simpler form of anchor, effective when the wheel is rotating in the reverse, or clockwise direction. This anchor comprises an anchor block 40 carried on a bracket 41 which is adjustable on the backing plate, as will hereinafter more fully appear. The anchor block 40 is provided with an inclined engaging face 40a against which the adjacent end piece 30 of brake band 13 is brought into contact when the brake is applied, with the wheel and drum rotating in a clockwise direction. This engaging face 40a is preferably arranged substantially at right angles to a line drawn at a tangent to the adjacent end of the friction surface of the brake band, as shown, this arrangement being preferable in order to take the thrust of the brake band in the proper tangential direction.

Tension devices are provided for normally holding the brake band in contracted position, such as a pair of springs 27 and 28 connected respectively near opposite ends of the band and acting in opposite directions, as shown. A plurality of set screws 14a, 14a extend at an angle through the backing plate 11 to engage the inner face of the brake band and limit the radial movement thereof in contracted position.

The brake-actuating mechanism comprises two toggle links 15 and 16, pivotally connected together on pin 17. The link 15 has pivotal connection with end piece 30 on pin 29, and link 16 has pivotal connection with end piece 20 on pin 19.

In the form shown, the anchor block 40 is provided with an open slot 43 on its inner face, within which the toggle link 15 is guided. This arrangement affords means for positioning the brake band axially of the drum, as well as providing a guide to maintain the movement of the link 15 in its proper path.

The toggle mechanism just described serves to spread the adjacent ends of the brake band to apply the brake, the toggle being actuated by a pair of links 32 connected to the inner end of actuating lever 35 by means of a universal joint connection indicated at 33.

Referring now more particularly to the subject matter of the present invention, which relates especially to the means for simultaneously readjusting the brake and the operating lever, it will be seen that the anchor block 40 and its bracket 41 are movable so as to provide the main means for readjusting the brake band. For this purpose, the bracket 41 is adjustably secured to the backing plate 11 by means of bolts 42, 42 working in slots 43, 43 in the backing plate. Said slots extend in a direction generally tangential to the adjacent end of the brake band, as shown in Figure 1. The arrangement is such that by loosening the bolts, the anchor block may be shifted to reset the brake band at the proper clearance relative to the drum, and is then maintained in the newly adjusted position by retightening the bolts.

Figure 2:
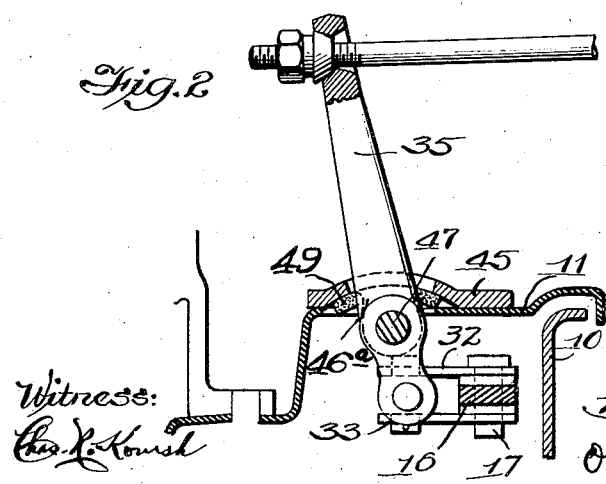
Figure 2 is a detail section taken on line 2—2 of Figure 1.
Figure 3:
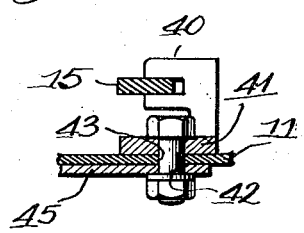
Figure 3 is a detail section taken on line 3—3 of Figure 1.

The method of readjustment of the brake band by shifting an anchor point, as above described, is in itself well known in the art, as applied to a wide variety of brake structures. It will be observed, however, that in the present invention I also provide a movable supporting plate 45, preferably on the outer side of the backing plate 11, which supporting plate has an inwardly-projecting bracket comprising a pair of spaced arms 46a, 46a, between which the operating lever 35 is pivoted on pin 47. The lever 35 extends through a slot 48 formed in the plate 45, as shown in Figure 2. A piece of resilient packing 49 is preferably carried on the lever immediately below the slot 48 so as to close the latter against dust and moisture.

It will now be understood, that if the pivot pin 47 of lever 35 were fixed relative to the backing plate instead of being movable as shown herein, any readjustment of the brake band, as for instance in taking up wear, would cause the lever 35 to be shifted to a new "idle" position in the same direction said lever is moved for applying the brakes. Thus, the idle position of the lever would be changed every time the brake bands are readjusted, and this in turn may necessitate a corresponding readjustment of the brake rods or other parts of the brake applying system.

In my improved construction, however, the plate 45 is also adjustable in position to compensate for any readjustment of the brake band, and in the preferred form shown, said plate is movable simultaneously with the anchor bracket 41 so as to automatically maintain the lever 35 in the proper "idle" position or angle relative to the backing plate, in all permissible positions of adjustment of the anchor. This is accomplished by extending the plate 45 to register with the bolts 42, 42 by which the bracket 40 is secured to the backing plate, said bolts passing through said plate so that the latter is connected and moves with said anchor whenever it is moved. The plate 45 is also provided with one or more auxiliary securing bolts 42a, which also move in a slot or slots 43a extending in the same general direction as the slots 43, 43 near the anchor bracket 41.

With the arrangement just described, both plate 45 and lever 35 are shifted as a unit with the anchor whenever it is readjusted, with the result that the idle angular position of the lever is not materially changed at any time, but is returned to its normal idle position every time the brakes are readjusted.

While I have shown my invention as applied to an internal expanding band type of brake, it will be understood that so far as the automatic positioning of the operating lever is concerned, the same principle may also be applied to any type of brake in which the take-up adjustment is made by shifting an anchor member or its equivalent in a generally circumferential direction.

I claim as my invention:

1. In a brake, a drum, a support, friction means engageable with said drum, means for adjusting the idle position of said friction means relative to said drum comprising a member movably mounted on said support, and applying means for said friction means including a lever having a pivotal connection on said support which is movable with said adjusting means, and maintaining said lever in a predetermined angular relation with said support in its various adjusted positions.

2. In a brake, a drum, a support, friction means engageable with said drum, means for adjusting the idle position of said friction means relative to said drum comprising a member movably mounted on said support, and applying means for said friction means including a lever extending in a direction generally parallel with the axis of said drum, said lever having a pivotal connection on said support which is movable with said adjusting means, and maintaining said lever in a predetermined angular relation with said support in its various adjusted positions.

3. In a brake, a drum, a backing plate, an internal friction member engageable with said drum, means adjustably supported on said backing plate to control the idle position of said friction member relative to said drum, a bracket also adjustably mounted on said backing plate, and applying means for said friction member including a lever pivotally mounted on said adjustable bracket, said lever extending in a direction generally parallel with the axis of said drum, and having its inner end moving in a direction substantially parallel with the paths of movement of both of said adjustable means.

4. In a brake, a drum, a backing plate, an internal friction member engageable with said drum, means adjustably supported on said backing plate to control the idle position of said friction member relative to said drum, a bracket also adjustably mounted on said backing plate, and applying means for said friction member including a lever pivotally mounted on said adjustable bracket, said two adjusting means mutually cooperating to maintain the lever in substantially the same idle position relative to said backing plate in their various positions of adjustment.

5. In a brake, a drum, a backing plate, an internal friction member engageable with said drum, means adjustably supported on said backing plate to control the idle position of said friction member relative to said drum, a bracket also adjustably mounted on said backing plate, and applying means for said friction member including a lever pivotally mounted on said adjustable bracket, said two adjusting means being movable bodily as a unit and mutually cooperating so as to maintain the lever in substantially the same idle position relative to said backing plate in the various adjusted positions of said means.

6. In a brake, a drum, a backing plate, an internal friction member engageable with said drum, an anchor supported on said backing plate to serve as a reaction member for said friction member and adjustable to control the idle position of the latter relative to said drum, guide means controlling the adjustment of said anchor in a direction substantially tangential to the adjacent end of said friction member, a bracket adjustably mounted on said backing plate and connected for bodily movement with said anchor, and applying means for said friction member including a lever pivotally mounted on said bracket.

7. In a brake, a drum, a backing plate, an internal friction member engageable with said drum, an anchor supported on said backing plate to serve as a reaction member for said friction member and adjustable to control the idle position of the latter relative to said drum, guide means controlling the adjustment of said anchor in a direction substantially tangential to the adjacent end of said friction member, a bracket adjustably mounted on said backing plate and connected for bodily movement with said anchor, and applying means for said friction member including a lever pivotally mounted on said bracket, said lever extending through said backing plate and having its outer end projecting in a direction generally transverse in the plane of rotation of said drum.

8. In a brake, a drum, a backing plate, an internal friction member engageable with said drum, an anchor supported on said backing plate to serve as a reaction member for said friction member and adjustable to control the idle position of the latter relative to said drum, guide means controlling the adjustment of said anchor in a direction substantially tangential to the adjacent end of said friction member, a bracket adjustably mounted on said backing plate and connected for bodily movement with said anchor, and applying means for said friction member including a lever pivotally mounted on said bracket, said lever having its point of pivotal connection with said bracket disposed within the backing plate.

9. In a brake, a drum, a support, friction means engageable with said drum, means for adjusting the idle position of said friction means relative to said drum, comprising a member movably mounted on said support, and applying means for said friction means, including a lever having a pivotal connection on said support which is movable in a direction parallel with the path of movement of said adjusting means, whereby said lever is maintained in a predetermined angular relation with said support in its various adjusted positions.

Signed at Racine this 20th day of June, 1929.

EARL G. GUNN.